US012559418B2

(12) United States Patent (10) Patent No.: US 12,559,418 B2
Beall et al. (45) Date of Patent: Feb. 24, 2026

(54) TRANSPARENT β-SPODUMENE GLASS-CERAMICS

(71) Applicant: CORNING INCORPORATED, Corning, NY (US)

(72) Inventors: George Halsey Beall, Big Flats, NY (US); Qiang Fu, Painted Post, NY (US); Charlene Marie Smith, Corning, NY (US); Alana Marie Whittier, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 628 days.

(21) Appl. No.: 17/992,183

(22) Filed: Nov. 22, 2022

(65) Prior Publication Data

US 2023/0167014 A1 Jun. 1, 2023

Related U.S. Application Data

(60) Provisional application No. 63/283,590, filed on Nov. 29, 2021.

(51) Int. Cl.
| | |
|---|---|
| *C03C 10/00* | (2006.01) |
| *C03B 32/02* | (2006.01) |
| *C03C 3/085* | (2006.01) |
| *C03C 21/00* | (2006.01) |
| *H05K 5/02* | (2006.01) |

(52) U.S. Cl.
CPC .......... *C03C 10/0027* (2013.01); *C03B 32/02* (2013.01); *C03C 3/085* (2013.01); *C03C 10/0054* (2013.01); *C03C 21/002* (2013.01)

(58) Field of Classification Search
CPC . C03C 10/0027; C03C 3/085; C03C 10/0045; C03B 32/02
See application file for complete search history.

(56) References Cited

U.S. PATENT DOCUMENTS

| | | | |
|---|---|---|---|
| 3,907,577 A | 9/1975 | Kiefer et al. | |
| 4,113,904 A | 9/1978 | Kiefer | |
| 7,823,416 B2 | 11/2010 | Aoki et al. | |
| 8,664,130 B2 | 3/2014 | Beall et al. | |
| 8,691,711 B2 | 4/2014 | Nakashima et al. | |
| 9,156,725 B2 | 10/2015 | Dejneka et al. | |
| 2011/0151282 A1 | 6/2011 | Nagashima | |

(Continued)

FOREIGN PATENT DOCUMENTS

| | | | |
|---|---|---|---|
| EP | 1593658 A1 | 11/2005 | |
| JP | 2668075 B2 | 10/1997 | |

(Continued)

OTHER PUBLICATIONS

ASTM C770-16, "Standard Test Method for Mesaurement of Glass Stress-Optical Coefficient", 2017, pp. 1-7.

(Continued)

*Primary Examiner* — Cameron K Miller
(74) *Attorney, Agent, or Firm* — Russell S. Magaziner

(57) ABSTRACT

A transparent β-spodumene glass-ceramic is provided. The glass-ceramic includes a primary crystal phase including a β-spodumene solid solution, a secondary crystal phase including tetragonal $ZrO_2$, and an amorphous phase. The glass-ceramic may be ion exchanged utilizing molten alkali nitrate salt baths. Methods for producing the glass-ceramic are also provided.

20 Claims, 6 Drawing Sheets

(56)          References Cited

U.S. PATENT DOCUMENTS

| | | |
|---|---|---|
| 2018/0319706 A1 | 11/2018 | Murayama et al. |
| 2019/0194057 A1 | 6/2019 | Murayama et al. |
| 2019/0263713 A1 | 8/2019 | Murayama et al. |
| 2019/0352227 A1 | 11/2019 | Koike et al. |
| 2019/0362754 A1 | 11/2019 | Sato et al. |
| 2020/0039876 A1 | 2/2020 | Imakita et al. |
| 2020/0109083 A1 | 4/2020 | Imakita et al. |
| 2020/0156994 A1 | 5/2020 | Li et al. |
| 2020/0239354 A1 | 7/2020 | Li et al. |

FOREIGN PATENT DOCUMENTS

| | | |
|---|---|---|
| WO | 2008/065166 A1 | 6/2008 |
| WO | 2017/223551 A1 | 12/2017 |
| WO | 2019/021911 A1 | 1/2019 |
| WO | 2020/217792 A1 | 10/2020 |

OTHER PUBLICATIONS

Fu, Q., et al., "Nature-inspired design of strong, tough glass-ceramics", MRS Bulletin, 2017, vol. 42, No. 3, pp. 220-225.
International Search Report and Written Opinion of the International Searching Authority; PCT/US2022/050345; dated Feb. 2023, 2023; 11 pages; European Patent Office.

TRANSPARENT β-SPODUMENE GLASS-CERAMICS

This application claims the benefit of priority of U.S. Provisional Application Ser. No. 63/283,590 filed on Nov. 29, 2021, the content of which is relied upon and incorporated herein by reference in its entirety.

BACKGROUND

Field

The present specification generally relates to transparent glass-ceramic compositions. More specifically, the present specification is directed to transparent β-spodumene solid solution glass-ceramics that may be formed into cover glass or housings for electronic devices.

Technical Background

Portable electronic devices, such as, smartphones, tablets, and wearable devices (such as, for example, watches and fitness trackers) continue to get smaller and more complex. As such, materials that are conventionally used on at least one external surface of such portable electronic devices also continue to get more complex. For instance, as portable electronic devices get smaller and thinner to meet consumer demand, the display covers and housings used in these portable electronic devices also get smaller and thinner, resulting in higher performance requirements for the materials used to form these components.

Glass-ceramic materials that have high transparency are attractive for such applications due to their high mechanical strength. Exemplary glass-ceramic materials are those which incorporate a β-spodumene solid solution crystal phase and exhibit high transparency. β-spodumene solid solution glass-ceramics may be chemically strengthened through ion exchange. The ion exchange occurs as alkali ions from a molten salt bath exchange for the lithium ions in the β-spodumene solid solution crystal phase, producing a compressive stress region at the surface and strengthening the glass-ceramic. The residual glass phase may also undergo ion exchange, depending on the composition of that phase. Many β-spodumene solid solution glass-ceramics include high amounts of $TiO_2$ as a nucleating agent, and as a result include a rutile phase that renders the glass-ceramic opaque.

Accordingly, a need exists for β-spodumene solid solution glass-ceramic materials that are transparent.

SUMMARY

According to aspect (1), a glass-ceramic article is provided. The glass-ceramic article comprises: a primary crystal phase comprising β-spodumene solid solution; a secondary crystal phase comprising tetragonal $ZrO_2$; an amorphous phase; greater than or equal to 0.2 mol % to less than or equal to 5 mol % MgO; greater than or equal to 0 mol % to less than or equal to 0.5 mol % $TiO_2$; and greater than or equal to 0.2 mol % to less than or equal to 4 mol % $ZrO_2$.

According to aspect (2), the glass-ceramic article of aspect (1) is provided, wherein the glass-ceramic article has a transmittance of greater than or equal to 50% in the wavelength range from 400 nm to 780 nm measured at a thickness of 0.6 mm.

According to aspect (3), the glass-ceramic article of any of aspect (1) to the preceding aspect is provided, comprising greater than or equal to 65 mol % to less than or equal to 80 mol % $SiO_2$.

According to aspect (4), the glass-ceramic article of any of aspect (1) to the preceding aspect is provided, comprising greater than or equal to 71 mol % to less than or equal to 75 mol % $SiO_2$.

According to aspect (5), the glass-ceramic article of any of aspect (1) to the preceding aspect is provided, comprising greater than or equal to 7 mol % to less than or equal to 18 mol % $Al_2O_3$.

According to aspect (6), the glass-ceramic article of any of aspect (1) to the preceding aspect is provided, comprising greater than or equal to 10 mol % to less than or equal to 15 mol % $Al_2O_3$.

According to aspect (7), the glass-ceramic article of any of aspect (1) to the preceding aspect is provided, comprising greater than or equal to 5 mol % to less than or equal to 10 mol % $Li_2O$.

According to aspect (8), the glass-ceramic article of any of aspect (1) to the preceding aspect is provided, comprising greater than or equal to 7 mol % to less than or equal to 8 mol % $Li_2O$.

According to aspect (9), the glass-ceramic article of any of aspect (1) to the preceding aspect is provided, comprising greater than or equal to 0.2 mol % to less than or equal to 5 mol % $Na_2O$.

According to aspect (10), the glass-ceramic article of any of aspect (1) to the preceding aspect is provided, comprising greater than or equal to 1 mol % to less than or equal to 2 mol % $Na_2O$.

According to aspect (11), the glass-ceramic article of any of aspect (1) to the preceding aspect is provided, comprising greater than or equal to 0 mol % to less than or equal to 4 mol % $K_2O$.

According to aspect (12), the glass-ceramic article of any of aspect (1) to the preceding aspect is provided, wherein the glass-ceramic article is substantially free of $K_2O$.

According to aspect (13), the glass-ceramic article of any of aspect (1) to the preceding aspect is provided, comprising greater than or equal to 2 mol % to less than or equal to 3 mol % MgO.

According to aspect (14), the glass-ceramic article of any of aspect (1) to the preceding aspect is provided, comprising greater than or equal to 1 mol % to less than or equal to 2 mol % $ZrO_2$.

According to aspect (15), the glass-ceramic article of any of aspect (1) to the preceding aspect is provided, wherein the glass-ceramic article is substantially free of $TiO_2$.

According to aspect (16), the glass-ceramic article of any of aspect (1) to the preceding aspect is provided, comprising greater than or equal to 0.05 mol % to less than or equal to 1 mol % $SnO_2$.

According to aspect (17), the glass-ceramic article of any of aspect (1) to the preceding aspect is provided, comprising greater than or equal to 0 mol % to less than or equal to 4 mol % $B_2O_3$.

According to aspect (18), the glass-ceramic article of any of aspect (1) to the preceding aspect is provided, wherein the glass-ceramic article is substantially free of $B_2O_3$.

According to aspect (19), the glass-ceramic article of any of aspect (1) to the preceding aspect is provided, comprising greater than or equal to 0 mol % to less than or equal to 5 mol % ZnO.

According to aspect (20), the glass-ceramic article of any of aspect (1) to the preceding aspect is provided, wherein the glass-ceramic article is substantially free of ZnO.

According to aspect (21), the glass-ceramic article of any of aspect (1) to the preceding aspect is provided, comprising greater than or equal to 0 mol % to less than or equal to 3 mol % $P_2O_5$.

According to aspect (22), the glass-ceramic article of any of aspect (1) to the preceding aspect is provided, wherein the glass-ceramic article is substantially free of $P_2O_5$.

According to aspect (23), the glass-ceramic article of any of aspect (1) to the preceding aspect is provided, wherein the glass-ceramic article is substantially free of arsenic.

According to aspect (24), the glass-ceramic article of any of aspect (1) to the preceding aspect is provided, wherein the β-spodumene solid solution has a grain size greater than or equal to 50 nm to less than or equal to 150 nm.

According to aspect (25), the glass-ceramic article of any of aspect (1) to the preceding aspect is provided, wherein the tetragonal $ZrO_2$ has a grain size greater than or equal to 10 nm to less than or equal to 20 nm.

According to aspect (26), the glass-ceramic article of any of aspect (1) to the preceding aspect is provided, comprising a crystallinity greater than or equal to 80 wt %.

According to aspect (27), the glass-ceramic article of any of aspect (1) to the preceding aspect is provided, wherein L* is greater than or equal to 90.0 to less than or equal to 95.0.

According to aspect (28), the glass-ceramic article of any of aspect (1) to the preceding aspect is provided, wherein a* is greater than or equal to −1.0 to less than or equal to 0.2.

According to aspect (29), the glass-ceramic article of any of aspect (1) to the preceding aspect is provided, wherein b* is greater than or equal to 3.0 to less than or equal to 9.0.

According to aspect (30), the glass-ceramic article of any of aspect (1) to the preceding aspect is provided, further comprising a compressive stress region extending from a surface of the glass-ceramic article to a depth of compression.

According to aspect (31), a consumer electronic product is provided. The consumer electronic product comprises: a housing having a front surface, a back surface and side surfaces; electrical components provided at least partially within the housing, the electrical components including at least a controller, a memory, and a display, the display being provided at or adjacent the front surface of the housing; and a cover substrate disposed over the display, wherein at least a portion of at least one of the housing and the cover substrate comprises the glass-based article of any of aspect (1) to the preceding aspect.

According to aspect (32), a glass is provided. The glass comprises: greater than or equal to 65 mol % to less than or equal to 80 mol % $SiO_2$; greater than or equal to 7 mol % to less than or equal to 18 mol % $Al_2O_3$; greater than or equal to 5 mol % to less than or equal to 8 mol % $Li_2O$; greater than or equal to 0.2 mol % to less than or equal to 4 mol % $Na_2O$; greater than or equal to 0.2 mol % to less than or equal to 5 mol % MgO; greater than or equal to 0 mol % to less than or equal to 0.5 mol % $TiO_2$; greater than or equal to 0.2 mol % to less than or equal to 4 mol % $ZrO_2$; and greater than 0 mol % to less than or equal to 1 mol % $SnO_2$.

According to aspect (33), the glass of aspect (32) is provided, comprising greater than or equal to 71 mol % to less than or equal to 75 mol % $SiO_2$.

According to aspect (34), the glass of any of aspect (32) to the preceding aspect is provided, comprising greater than or equal to 10 mol % to less than or equal to 15 mol % $Al_2O_3$.

According to aspect (35), the glass of any of aspect (32) to the preceding aspect is provided, comprising greater than or equal to 7 mol % to less than or equal to 8 mol % $Li_2O$.

According to aspect (36), the glass of any of aspect (32) to the preceding aspect is provided, comprising greater than or equal to 1 mol % to less than or equal to 2 mol % $Na_2O$.

According to aspect (37), the glass of any of aspect (32) to the preceding aspect is provided, comprising greater than or equal to 0 mol % to less than or equal to 4 mol % $K_2O$.

According to aspect (38), the glass of any of aspect (32) to the preceding aspect is provided, wherein the glass is substantially free of $K_2O$.

According to aspect (39), the glass of any of aspect (32) to the preceding aspect is provided, comprising greater than or equal to 2 mol % to less than or equal to 3 mol % MgO.

According to aspect (40), the glass of any of aspect (32) to the preceding aspect is provided, comprising greater than or equal to 1 mol % to less than or equal to 2 mol % $ZrO_2$.

According to aspect (41), the glass of any of aspect (32) to the preceding aspect is provided, wherein the glass is substantially free of $TiO_2$.

According to aspect (42), the glass of any of aspect (32) to the preceding aspect is provided, comprising greater than or equal to 0.05 mol % to less than or equal to 1 mol % $SnO_2$.

According to aspect (43), the glass of any of aspect (32) to the preceding aspect is provided, comprising greater than or equal to 0 mol % to less than or equal to 4 mol % $B_2O_3$.

According to aspect (44), the glass of any of aspect (32) to the preceding aspect is provided, wherein the glass is substantially free of $B_2O_3$.

According to aspect (45), the glass of any of aspect (32) to the preceding aspect is provided, comprising greater than or equal to 0 mol % to less than or equal to 5 mol % ZnO.

According to aspect (46), the glass of any of aspect (32) to the preceding aspect is provided, wherein the glass is substantially free of ZnO.

According to aspect (47), the glass of any of aspect (32) to the preceding aspect is provided, comprising greater than or equal to 0 mol % to less than or equal to 3 mol % $P_2O_5$.

According to aspect (48), the glass of any of aspect (32) to the preceding aspect is provided, wherein the glass is substantially free of $P_2O_5$.

According to aspect (49), the glass of any of aspect (32) to the preceding aspect is provided, wherein the glass is substantially free of arsenic.

According to aspect (50), a method is provided. The method comprises: ceramming a glass substrate to form a glass-ceramic article; wherein the glass-ceramic article comprises: a primary crystal phase comprising β-spodumene solid solution; a secondary crystal phase comprising tetragonal $ZrO_2$; an amorphous phase; greater than or equal to 0.2 mol % to less than or equal to 5 mol % MgO; greater than or equal to 0 mol % to less than or equal to 0.5 mol % $TiO_2$; and greater than or equal to 0.2 mol % to less than or equal to 4 mol % $ZrO_2$.

According to aspect (51), the method of aspect (50) is provided, wherein the ceramming comprises: treating the glass substrate at a nucleation temperature for a nucleation time period to form a nucleated glass substrate; and treating the nucleated glass substrate at a growth temperature for a growth time period to form the glass-ceramic article, wherein the nucleation temperature is less than the growth temperature and the nucleation time period is greater than the growth time period.

According to aspect (52), the method of aspect (51) is provided, wherein the nucleation temperature is greater than or equal to 750° C. to less than or equal to 950° C.

According to aspect (53), the method of any of aspect (51) to the preceding aspect is provided, wherein the nucleation time period is greater than or equal to 0.5 hours to less than or equal to 8 hours.

According to aspect (54), the method of any of aspect (51) to the preceding aspect is provided, wherein the growth temperature is greater than or equal to 900° C. to less than or equal to 1100° C.

According to aspect (55), the method of any of aspect (51) to the preceding aspect is provided, wherein the growth time period is greater than or equal to 0.5 hours to less than or equal to 8 hours.

According to aspect (56), the method of any of aspect (50) to the preceding aspect is provided, comprising ion exchanging the glass-ceramic article to form a compressive stress region extending from a surface of the glass-ceramic article to a depth of compression.

According to aspect (57), the method of any of aspect (50) to the preceding aspect is provided, wherein the glass substrate comprises: greater than or equal to 65 mol % to less than or equal to 80 mol % $SiO_2$; greater than or equal to 7 mol % to less than or equal to 18 mol % $Al_2O_3$; greater than or equal to 5 mol % to less than or equal to 10 mol % $Li_2O$; greater than or equal to 0.2 mol % to less than or equal to 5 mol % $Na_2O$; greater than or equal to 0.2 mol % to less than or equal to 5 mol % MgO; greater than or equal to 0 mol % to less than or equal to 0.5 mol % $TiO_2$; greater than or equal to 0.2 mol % to less than or equal to 4 mol % $ZrO_2$; and greater than 0 mol % to less than or equal to 1 mol % $SnO_2$.

According to aspect (58), the method of any of aspect (50) to the preceding aspect is provided, wherein the glass substrate comprises: greater than or equal to 65 mol % to less than or equal to 80 mol % $SiO_2$; greater than or equal to 7 mol % to less than or equal to 18 mol % $Al_2O_3$; greater than or equal to 5 mol % to less than or equal to 8 mol % $Li_2O$; greater than or equal to 0.2 mol % to less than or equal to 4 mol % $Na_2O$; greater than or equal to 0.2 mol % to less than or equal to 5 mol % MgO; greater than or equal to 0 mol % to less than or equal to 0.5 mol % $TiO_2$; greater than or equal to 0.2 mol % to less than or equal to 4 mol % $ZrO_2$; and greater than 0 mol % to less than or equal to 1 mol % $SnO_2$.

According to aspect (59), the method of any of aspect (50) to the preceding aspect is provided, wherein the glass-ceramic article has a transmittance of greater than or equal to 50% in the wavelength range from 400 nm to 780 nm measured at a thickness of 0.6 mm.

According to aspect (60), the method of any of aspect (50) to the preceding aspect is provided, wherein the β-spodumene solid solution has a grain size greater than or equal to 50 nm to less than or equal to 150 nm.

According to aspect (61), the method of any of aspect (50) to the preceding aspect is provided, wherein the tetragonal $ZrO_2$ has a grain size greater than or equal to 10 nm to less than or equal to 20 nm.

According to aspect (62), the method of any of aspect (50) to the preceding aspect is provided, wherein the glass-ceramic article comprises a crystallinity greater than or equal to 80 wt %.

According to aspect (63), the method of any of aspect (50) to the preceding aspect is provided, wherein the glass-ceramic article is characterized by L* greater than or equal to 90.0 to less than or equal to 95.0.

According to aspect (64), the method of any of aspect (50) to the preceding aspect is provided, wherein the glass-ceramic article is characterized by a* greater than or equal to −1.0 to less than or equal to 0.2.

According to aspect (65), the method of any of aspect (50) to the preceding aspect is provided, wherein the glass-ceramic article is characterized by b* greater than or equal to 3.0 to less than or equal to 9.0.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein and, together with the description, serve to explain the principles and operations of the claimed subject matter.

DETAILED DESCRIPTION

Figure 1:
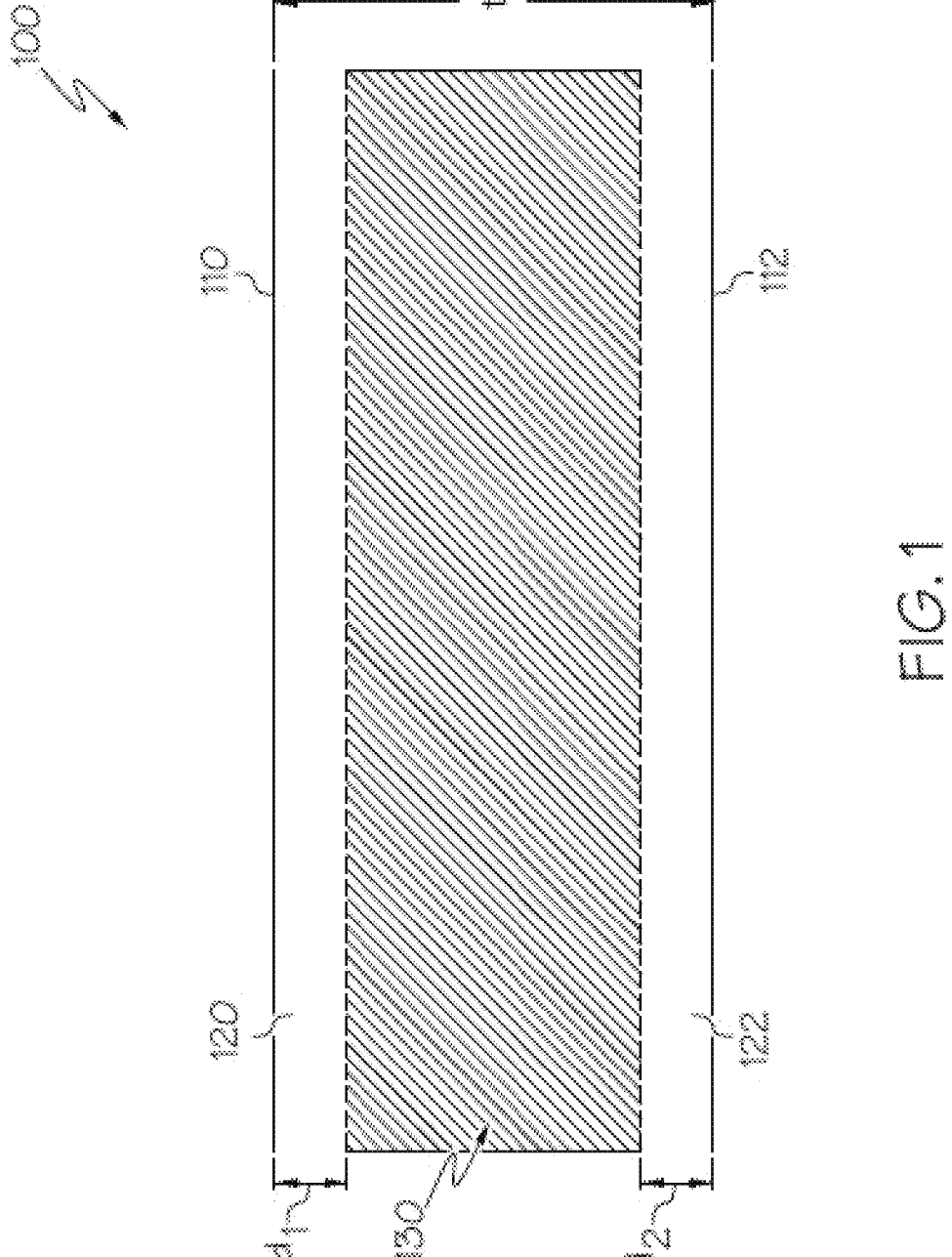
FIG. 1 schematically depicts a cross section of a glass-ceramic having compressive stress layers on surfaces thereof according to embodiments disclosed and described herein.

Reference will now be made in detail to transparent β-spodumene glass-ceramics according to various embodiments. In particular, the transparent β-spodumene glass-ceramics may be ion exchanged utilizing molten nitrate salt baths. Therefore, the transparent β-spodumene glass-ceramics are suited for use as display covers and housings in portable electronic devices.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. Whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

Unless otherwise specified, all compositions of the glasses described herein are expressed in terms of mole percent (mol %), and the constituents are provided on an oxide basis. Unless otherwise specified, all temperatures are expressed in terms of degrees Celsius (° C.).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. For example, a composition that is "substantially free of $K_2O$" is one in which $K_2O$ is not actively added or batched into the composition, but may be present in very small amounts as a contaminant, such as in amounts of less than about 0.01 mol %. As utilized herein, when the term "about" is used to modify a value, the exact value is also disclosed.

The glass-ceramics described herein contain a primary crystal phase, a secondary crystal phase, and a residual amorphous (glass) phase. In embodiments, the amorphous phase may be an alkali aluminosilicate glass phase, an alkaline earth aluminosilicate phase, or a mixed alkali-alkaline earth aluminosilicate phase. In a preferred embodiment, the amorphous phase is a lithium aluminosilicate glass phase. The primary crystal phase is the predominant crystal phase, defined herein as the crystal phase that accounts for the largest fraction of the glass-ceramic by weight. Accordingly, the secondary crystal phase may be present in an amount of the glass-ceramic that is less than the amount of the primary crystal phase, and the amounts the of the crystal phases in the glass-ceramic may be described in terms of weight percent of the glass-ceramic. In some embodiments, the glass-ceramic may include additional crystal phases, such that the glass-ceramic includes more than two crystal phases.

In embodiments, the primary crystal phase includes a β-spodumene solid solution. The β-spodumene solid solution is a β-spodumene crystal structure that has been 'stuffed' with additional oxide components, such as MgO. The β-spodumene crystal structure possesses a framework structure of corner-connected $SiO_4$ and $AlO_4$ tetrahedra that form interlocking rings, and the interlocking rings form channels that contain lithium ions. It should be understood that references to a β-spodumene crystal phase herein are intended to describe a β-spodumene solid solution crystal phase.

The primary crystal phase may have a grain size that is small enough to prevent degradation of the transparency of the glass-ceramic. Larger grain sizes may result in an opaque glass-ceramic. In embodiments, the primary crystal phase has a grain size of less than or equal to 150 nm, such as less than or equal to 140 nm, less than or equal to 130 nm, less than or equal to 120 nm, less than or equal to 110 nm, less than or equal to 110 nm, less than or equal to 100 nm, less than or equal to 90 nm, less than or equal to 80 nm, less than or equal to 70 nm, less than or equal to 60 nm, or less. In embodiments, the primary crystal phase has a grain size of greater than or equal to 50 nm, such as greater than or equal to 60 nm, greater than or equal to 70 nm, greater than or equal to 80 nm, greater than or equal to 90 nm, greater than or equal to 100 nm, greater than or equal to 110 nm, greater than or equal to 120 nm, greater than or equal to 130 nm, greater than or equal to 140 nm, or more. In embodiments, the primary crystal phase has a grain size of greater than or equal to 50 nm to less than or equal to 150 nm, such as greater than or equal to 60 nm to less than or equal to 140 nm, greater than or equal to 70 nm to less than or equal to 130 nm, greater than or equal to 80 nm to less than or equal to 120 nm, greater than or equal to 90 nm to less than or equal to 110 nm, greater than or equal to 50 nm to less than or equal to 100 nm, and any and all ranges formed from any of the foregoing endpoints. The grain size as used herein is determined by analysis of scanning electron microscope (SEM) images of the polished and etched glass-ceramic article surface. As utilized herein, the grain size refers to an average grain size. The grain size may also be determined by powder x-ray diffraction (XRD) analysis with a scan from 10 to 80 degrees 2θ, and estimated by measuring the full width half maximum intensity (FWHM) and then calculation using the Scherrer equation function available in MDI Jade, the software package utilized for phase identification and quantitative analysis.

In embodiments, the secondary crystal phase includes tetragonal zirconia, which may be indicated as t-$ZrO_2$. The formation of the tetragonal $ZrO_2$ in the glass-ceramic requires the presence of $ZrO_2$ in the precursor glass. Without wishing to be bound by any particular theory, it is believed that the tetragonal $ZrO_2$ crystal phase crystallizes before the β-spodumene crystal phase during ceramming, and acts as a nucleation site for the β-spodumene crystal phase. In some embodiments, the composition of the precursor glass and the ceramming conditions may result in a glass-ceramic that includes additional crystal phases beyond those described above.

The secondary crystal phase may have a grain size that is small enough to prevent degradation of the transparency of the glass-ceramic. Larger grain sizes may result in an opaque glass-ceramic. In embodiments, the primary crystal phase has a grain size of less than or equal to 20 nm, such as less than or equal to 19 nm, less than or equal to 18 nm, less than or equal to 17 nm, less than or equal to 16 nm, less than or equal to 15 nm, less than or equal to 14 nm, less than or equal to 13 nm, less than or equal to 12 nm, less than or equal to 11 nm, or less. In embodiments, the primary crystal phase has a grain size of greater than or equal to 10 nm, such as greater than or equal to 11 nm, greater than or equal to 12 nm, greater than or equal to 13 nm, greater than or equal to 14 nm, greater than or equal to 15 nm, greater than or equal to 16 nm, greater than or equal to 17 nm, greater than or equal to 18 nm, greater than or equal to 19 nm, or more. In embodiments, the primary crystal phase has a grain size of greater than or equal to 10 nm to less than or equal to 20 nm, such as greater than or equal to 11 nm to less than or equal to 19 nm, greater than or equal to 12 nm to less than or equal to 18 nm, greater than or equal to 13 nm to less than or equal to 17 nm, greater than or equal to 14 nm to less than or equal to 16 nm, greater than or equal to 10 nm to less than or equal to 15 nm, and any and all ranges formed from any of the foregoing endpoints.

In embodiments, the total crystallinity of the glass-ceramic is high enough to provide enhanced mechanical properties, such as hardness, Young's modulus, and scratch resistance. As utilized herein, the total crystallinity is provided in wt % and refers to the sum of the wt % of all the crystal phases present in the glass-ceramic. In embodiments, the total crystallinity is greater than or equal to 80 wt %, such as greater than or equal to 85 wt %, greater than or equal to 85 wt %, or more. In embodiments, the total crystallinity is greater than or equal to 80 wt % to less than or equal to 99 wt %, such as greater than or equal to 85 wt % to less than or equal to 95 wt %, greater than or equal to 80 wt % to less than or equal to 90 wt %, and any and all ranges formed from any of the foregoing endpoints. The total crystallinity of the glass-ceramic is determined through Rietveld quantitative analysis of data gathered by powder x-ray diffraction (XRD) analysis with a scan from 10 to 50 degrees 2θ. The Rietveld analysis employs a least squares method to model the XRD data and then determine the concentration of phases in the sample based on known lattice and scale factors for the identified phases.

The glass-ceramics disclosed herein have a high degree of transmittance, and may be transparent. As utilized herein, a glass-ceramic is considered transparent when exhibiting a transmittance of at least 80% throughout the visible wavelength range (400 nm to 780 nm) for a thickness of 0.6 mm. The transmittance, as utilized herein refers to total transmittance, and is measured with a Perkin Elmer Lambda 950 UV/VIS/NIR spectrophotometer with a 150 mm integrating sphere, with samples mounted at the sphere's entrance port allowing for collection of wide-angle scattered light and the total transmittance data collected with the reference Spectralon reflectance disc over the sphere's exit port. The percent of total transmittance (% T) is calculated relative to an open beam baseline measurement. Unless otherwise specified, the transmittance is measured on glass-ceramic articles with a thickness of 0.6 mm. In embodiments, the glass-ceramic exhibits a transmittance over the visible wavelength range of greater than or equal to 50%, such as greater than or equal to 55%, greater than or equal to 60%, greater than or equal to 65%, greater than or equal to 70%, greater than or equal to 71%, greater than or equal to 72%, greater than or equal to 73%, greater than or equal to 74%, greater than or equal to 75%, greater than or equal to 76%, greater than or equal to 77%, greater than or equal to 78%, greater than or equal to 79%, greater than or equal to 80%, greater than or equal to 81%, greater than or equal to 82%, greater than or equal to 83%, greater than or equal to 84%, greater than or equal to 85%, or more.

The glass-ceramics described herein are not heavily colored, and may have a substantially colorless appearance. The color of the glass-ceramics may be described in terms of L*, a*, b* reflectance color coordinates. Unless otherwise indicated, the L*, a*, b* reflectance color coordinates are measured using an X-rite Color i7 Benchtop Spectrophotometer using a F02 illuminant under SCI UVC conditions on 0.6 mm thick samples. In embodiments, the glass-ceramic has a L* value greater than or equal to 90.0 to less than or equal to 95.0, such as greater than or equal to 91.0 to less than or equal to 94.0, greater than or equal to 92.0 to less than or equal to 93.0, and any and all sub-ranges formed from the any of the forgoing endpoints. In embodiments, the glass-ceramic has an a* value greater than or equal to −1.0 to less than or equal to 0.2, such as greater than or equal to −0.9 to less than or equal to 0.1, greater than or equal to −0.8 to less than or equal to 0, greater than or equal to −0.7 to less than or equal to −0.1, greater than or equal to −0.6 to less than or equal to −0.2, greater than or equal to −0.5 to less than or equal to −0.3, greater than or equal to −0.4 to less than or equal to 0.2, and any and all sub-ranges formed from the any of the forgoing endpoints. In embodiments, the glass-ceramic has a b* value greater than or equal to 0 to less than or equal to 9.0, such as greater than or equal to 1.0 to less than or equal to 9.0, greater than or equal to 2.0 to less than or equal to 9.0, greater than or equal to 3.0 to less than or equal to 9.0, greater than or equal to 4.0 to less than or equal to 8.0, greater than or equal to 5.0 to less than or equal to 7.0, greater than or equal to 3.0 to less than or equal to 6.0, and any and all sub-ranges formed from the any of the forgoing endpoints. In a preferred embodiment, the glass-ceramic has a L* value greater than or equal to 90.0 to less than or equal to 95.0, an a* value greater than or equal to −1.0 to less than or equal to 0.2, and a b* value greater than or equal to 3.0 to less than or equal to 9.0.

The composition of the glass-ceramics will now be described. Components of the glass-ceramics according to embodiments are discussed individually below, with reference to the composition of the precursor glass. The composition of the precursor glass is understood to be the same as the bulk composition of the glass-ceramics formed therefrom, prior to any ion exchange treatment. The precursor glass compositions described herein may allow the formation of a glass-ceramic article that includes a lithium aluminosilicate amorphous phase, enabling ion exchange of the amorphous phase with sodium and/or potassium containing baths in addition to the ion exchange of the β-spodumene solid solution phase. The glass-ceramics described herein are formed from lithium aluminosilicate precursor glasses. It should be understood that any of the variously recited ranges of one component may be individually combined with any of the variously recited ranges for any other component.

In embodiments of the glass-ceramics disclosed herein, $SiO_2$ is the largest constituent. The $SiO_2$ serves as the primary glass-forming oxide for the precursor glass and stabilizes the networking structure of the precursor glass and glass-ceramic. The $SiO_2$ must be sufficiently high to ensure that a β-spodumene solid solution is formed when the precursor glass is cerammed. Pure $SiO_2$ has a high melting point. Accordingly, if the concentration of $SiO_2$ in the glass-ceramic is too high, the formability of the precursor glass composition used to form the glass-ceramics may be diminished as higher concentrations of $SiO_2$ increase the difficulty of melting the glass, which, in turn, adversely impacts the formability of the precursor glass. In embodiments, the glass composition comprises $SiO_2$ in an amount from greater than or equal to 65 mol % to less than or equal to 80 mol %, such as greater than or equal to 66 mol % to less than or equal to 79 mol %, greater than or equal to 67 mol % to less than or equal to 78 mol %, greater than or equal to 68 mol % to less than or equal to 77 mol %, greater than or equal to 69 mol % to less than or equal to 76 mol %, greater than or equal to 70 mol % to less than or equal to 75 mol %, greater than or equal to 71 mol % to less than or equal to 74 mol %, greater than or equal to 72 mol % to less than or equal to 73 mol %, and any and all sub-ranges formed from the any of the forgoing endpoints. In a preferred embodiment, the glass composition comprises $SiO_2$ in an amount from greater than or equal to 71 mol % to less than or equal to 75 mol %

The glass-ceramics include $Al_2O_3$. $Al_2O_3$ may increase the viscosity of the precursor glass compositions, decreasing the formability of the glass composition when the amount of $Al_2O_3$ is too high. However, when the concentration of $Al_2O_3$ is balanced against the concentration of $SiO_2$ and the concentration of alkali oxides in the glass composition, $Al_2O_3$ can reduce the liquidus temperature of the glass melt, thereby enhancing the liquidus viscosity and improving the compatibility of the precursor glass composition with certain forming processes. The inclusion of $Al_2O_3$ also improves the mechanical properties and chemical durability of the glass-ceramic. The $Al_2O_3$ in the precursor glass also supplies the aluminum necessary to form the β-spodumene solid solution crystal phase when the precursor glass is cerammed to form a glass-ceramic. In embodiments, the glass composition comprises $Al_2O_3$ in an amount greater than or equal to 7 mol % to less than or equal to 18 mol %, such as greater than or equal to 8 mol % to less than or equal to 17 mol %, greater than or equal to 9 mol % to less than or equal to 16 mol %, greater than or equal to 10 mol % to less than or equal to 15 mol %, greater than or equal to 11 mol % to less than or equal to 14 mol %, greater than or equal to 12 mol % to less than or equal to 13 mol %, and any and all sub-ranges formed from any of the foregoing endpoints. In a preferred embodiment, the glass composition comprises $Al_2O_3$ in an amount greater than or equal to 10 mol % to less than or equal to 15 mol %.

The glass-ceramic includes lithium. The inclusion of $Li_2O$ in the glass-ceramic is necessary for the formation of the β-spodumene solid solution, allows for an ion exchange process, and reduces the melting point of the precursor glass composition. Too much $Li_2O$ in the glass may result in an undesirably high liquidus temperature of the precursor glass. The $Li_2O$ may partition in both the β-spodumene solid solution and in the residual glass phase of the glass-ceramic when the precursor glass is cerammed. In embodiments, the glass composition comprises $Li_2O$ in an amount greater than or equal to 5 mol % to less than or equal to 10 mol %, such as greater than or equal to 6 mol % to less than or equal to 9 mol %, greater than or equal to 7 mol % to less than or equal to 8 mol %, and any and all sub-ranges formed from any of the foregoing endpoints. In a preferred embodiment, the glass composition comprises $Li_2O$ in an amount greater than or equal to 7 mol % to less than or equal to 8 mol %.

The glass-ceramic composition may be characterized by the total included amount of alkali metal oxides. The alkali metal oxides may facilitate the chemical strengthening of the glass-ceramic, such as through an ion exchange process. The sum of the alkali metal oxides ($Li_2O$, $Na_2O$, $K_2O$, $Cs_2O$, and $Rb_2O$) in the glass-ceramic may be referred to as "$R_2O$", and $R_2O$ may be expressed in mol %. In some embodiments, the glass-ceramic may include a mixture of alkali metal oxides, such as a combination of $Li_2O$ and $Na_2O$, a combination of $Li_2O$ and $K_2O$, or a combination of $Li_2O$, $Na_2O$, and $K_2O$. Without wishing to be bound by any particular theory, it is believed that at least some of the alkali metal oxides segregate into the residual glass phase of the glass-ceramic upon ceramming facilitating the ion exchange of the amorphous phase of the glass-ceramic in addition to the ion exchange of the β-spodumene solid solution phase, as described herein.

The glass-ceramic may include sodium. Like $Li_2O$, $Na_2O$ aids in the ion exchangeability of the glass-ceramic, and also decreases the melting point of the precursor glass composition and improves formability of the precursor glass composition. The inclusion of $Na_2O$ may also reduce the ceramming time necessary to produce the glass-ceramic. In embodiments, the precursor glass composition comprises $Na_2O$ in an amount greater than or equal to 0 mol % to less than or equal to 5 mol %, such as greater than or equal to 0.2 mol % to less than or equal to 5 mol %, greater than or equal to 1 mol % to less than or equal to 4 mol %, greater than or equal to 2 mol % to less than or equal to 3 mol %, and any and all sub-ranges formed from any of the foregoing endpoints. In a preferred embodiment, the precursor glass composition comprises $Na_2O$ in an amount greater than or equal to 1 mol % to less than or equal to 2 mol %.

The glass-ceramic may also include $K_2O$. The inclusion of $K_2O$ may reduce the melting temperature of the precursor glass and reduce the ceramming time necessary to produce the glass-ceramic. In embodiments, the precursor glass composition comprises $K_2O$ in an amount greater than or equal to 0 mol % to less than or equal to 4 mol %, such as greater than or equal to 0.5 mol % to less than or equal to 3 mol %, greater than or equal to 1 mol % to less than or equal to 2 mol %, and any and all sub-ranges formed from any of the foregoing endpoints. In a preferred embodiment, the precursor glass composition is substantially free or free of $K_2O$.

The glass-ceramics include MgO. The MgO in the precursor glass may enter the β-spodumene solid solution crystal phase when the precursor glass is cerammed to form a glass-ceramic. MgO also improves the melting behavior of the glass and may lower the cost of materials utilized to form the glass. In embodiments, the amount of MgO in the precursor glass is greater than or equal to 0.2 mol % to less than or equal to 5 mol %, such as greater than or equal to 0.5 mol % to less than or equal to 4.5 mol %, greater than or equal to 1 mol % to less than or equal to 4 mol %, greater than or equal to 1.5 mol % to less than or equal to 3.5 mol %, greater than or equal to 2 mol % to less than or equal to 2.5 mol %, and any and all sub-ranges formed from any of the foregoing endpoints. In preferred embodiments, the amount of MgO in the precursor glass is greater than or equal to 2 mol % to less than or equal to 3 mol %.

The glass-ceramics may include ZnO. The ZnO in the precursor glass may enter the β-spodumene solid solution crystal phase when the precursor glass is cerammed to form a glass-ceramic. ZnO also improves the melting behavior of the glass and may lower the cost of materials utilized to form the glass. In embodiments, the glass composition comprises ZnO in an amount greater than or equal to 0 mol % to less than or equal to 5 mol %, such greater than or equal to 0.5 mol % to less than or equal to 4.5 mol %, greater than or equal to 1 mol % to less than or equal to 4 mol %, greater than or equal to 1.5 mol % to less than or equal to 3.5 mol %, greater than or equal to 2 mol % to less than or equal to 3 mol %, greater than or equal to 0 mol % to less than or equal to 2.5 mol %, and any and all sub-ranges formed from any of the foregoing endpoints. In a preferred embodiment, the precursor glass composition is substantially free or free of ZnO.

The glass-ceramics include $ZrO_2$. The $ZrO_2$ acts as a nucleating agent to enable bulk nucleation of the glass-ceramic. If the concentration of $ZrO_2$ is too low, the precursor glass may not crystallize to form the glass-ceramic when cerammed. If the concentration of $ZrO_2$ is too high, the precursor glass may spontaneously devitrify when the precursor glass is cooled during the forming process. In addition to acting as a nucleating agent, the presence of $ZrO_2$ in the precursor glass facilitates the crystallization of tetragonal $ZrO_2$ during the ceramming process. In embodiments, the amount of $ZrO_2$ in the precursor glass is greater than 0.2 mol % to less than or equal to 4 mol %, such as greater than or equal to 0.5 mol % to less than or equal to 3.5 mol %, greater than or equal to 1 mol % to less than or equal to 3 mol %, greater than or equal to 1.5 mol % to less than or equal to 2.5 mol %, greater than or equal to 0.2 mol % to less than or equal to 2 mol %, and any and all sub-ranges formed from any of the foregoing endpoints. In a preferred embodiment, the amount of $ZrO_2$ in the precursor glass is greater than 1 mol % to less than or equal to 2 mol %.

In embodiments, the glass-ceramic may include $TiO_2$. The $TiO_2$ may act as an additional nucleating agent. If the content of $TiO_2$ is too high the glass-ceramic may have an undesirably colored appearance. For example, glass-ceramics that include $TiO_2$ may have a yellow or brown appearance even when transparent in the visible range. Additionally, a high amount of $TiO_2$ may lead to the formation of the high refractive index rutile phase in the glass-ceramic, which is not desired for achieving high transparency. In embodiments, the amount of $TiO_2$ in the precursor glass is greater than or equal to 0 mol % to less than or equal to 0.5 mol %, such as greater than or equal to 0.1 mol % to less than or equal to 0.25 mol %, greater than or equal to 0.25 mol % to less than or equal to 0.5 mol %, and any and all sub-ranges formed from the foregoing endpoints. In embodiments, the glass-ceramic is substantially free or free of $TiO_2$.

In embodiments, the glass-ceramic may optionally include one or more fining agents. In some embodiments, the fining agents may include, for example, tin oxide ($SnO_2$). In embodiments, $SnO_2$ may be present in the precursor glass composition in an amount greater than or equal to 0 mol % to less than or equal to 1 mol %, such as from greater than or equal to 0.05 mol % to less than or equal to 1 mol %, greater than or equal to 0.1 mol % to less than or equal to 0.9 mol %, greater than or equal to 0.2 mol % to less than or equal to 0.8 mol %, greater than or equal to 0.3 mol % to less than or equal to 0.7 mol %, greater than or equal to 0.4 mol % to less than or equal to 0.6 mol %, greater than or equal to 0.1 mol % to less than or equal to 0.3 mol %, and all ranges and sub-ranges between the foregoing values. In embodiments, the glass-ceramic is substantially free or free of $SnO_2$. If the content of $SnO_2$ in the glass-ceramic is too high an undesirable color may result. In embodiments, the glass-ceramic may be free or substantially free of one or both of arsenic and antimony. In a preferred embodiment, the glass-ceramic is free or substantially free of arsenic.

The glass-ceramic may include $B_2O_3$. The inclusion of $B_2O_3$ in the precursor glass may increase the native damage resistance of the precursor glass and the glass-ceramic formed therefrom. In embodiments, the amount of $B_2O_3$ in the precursor glass is greater than or equal to 0 mol % to less than or equal to 4 mol %, such as greater than or equal to 0.5 mol % to less than or equal to 3.5 mol %, greater than or equal to 1 mol % to less than or equal to 3 mol %, greater than or equal to 1.5 mol % to less than or equal to 2.5 mol %, greater than or equal to 0 mol % to less than or equal to 2 mol %, and all ranges and sub-ranges between the foregoing values. In a preferred embodiment, the glass-ceramic is substantially free or free of $B_2O_3$.

The glass-ceramic may include $P_2O_5$. The inclusion of $P_2O_5$ in the precursor glass may increase the ion exchangeability of the precursor glass and the glass-ceramic formed therefrom. In embodiments, the amount of $P_2O_5$ in the precursor glass is greater than or equal to 0 mol % to less than or equal to 3 mol %, such as greater than or equal to 0.5 mol % to less than or equal to 2.5 mol %, greater than or equal to 1 mol % to less than or equal to 2 mol %, greater than or equal to 0 mol % to less than or equal to 1.5 mol %, and all ranges and sub-ranges between the foregoing values. In a preferred embodiment, the glass-ceramic is substantially free or free of $P_2O_5$.

The glass-ceramic articles may be described based on a combination of phase assemblage and oxide concentration. In embodiments, the glass-ceramic article may include a primary crystal phase comprising β-spodumene solid solution, a secondary crystal phase comprising tetragonal $ZrO_2$, an amorphous phase, greater than or equal to 0.2 mol % to less than or equal to 5 mol % MgO, greater than or equal to 0 mol % to less than or equal to 0.5 mol % $TiO_2$, and greater than or equal to 0.2 mol % to less than or equal to 4 mol % $ZrO_2$.

In embodiments, a precursor glass article, also referred to herein as a glass substrate, may be subjected to a ceramming process to form a glass-ceramic article. The precursor glass article may have any composition that will result in the desired glass-ceramic article when cerammed, and may be selected from the above-described compositional ranges. In embodiments the precursor glass article has a composition including: greater than or equal to 65 mol % to less than or equal to 80 mol % $SiO_2$; than or equal to 7 mol % to less than or equal to 18 mol % $Al_2O_3$; greater than or equal to 5 mol % to less than or equal to 10 mol % $Li_2O$; greater than or equal to 0.2 mol % to less than or equal to 5 mol % $Na_2O$; greater than or equal to 0.2 mol % to less than or equal to 5 mol % MgO; greater than or equal to 0 mol % to less than or equal to 0.5 mol % $TiO_2$; greater than or equal to 0.2 mol % to less than or equal to 4 mol % $ZrO_2$; and greater than or equal to 0 mol % to less than or equal to 1 mol % $SnO_2$. In a preferred embodiment the precursor glass article has a composition including: greater than or equal to 65 mol % to less than or equal to 80 mol % $SiO_2$; than or equal to 7 mol % to less than or equal to 18 mol % $Al_2O_3$; greater than or equal to 5 mol % to less than or equal to 8 mol % $Li_2O$; greater than or equal to 0.2 mol % to less than or equal to 4 mol % $Na_2O$; greater than or equal to 0.2 mol % to less than or equal to 5 mol % MgO; greater than or equal to 0 mol % to less than or equal to 0.5 mol % $TiO_2$; greater than or equal to 0.2 mol % to less than or equal to 4 mol % $ZrO_2$; and greater than or equal to 0 mol % to less than or equal to 1 mol % $SnO_2$.

From the above, glass-ceramics according to embodiments may be formed from precursor glass articles formed by any suitable method, such as slot forming, float forming, rolling processes, fusion forming processes, mold forming processes, etc. A precursor glass article may be characterized by the manner in which it is formed. For instance, the precursor glass article may be characterized as float-formable (i.e., formed by a float process), down-drawable and, in particular, fusion-formable or slot-drawable (i.e., formed by a down draw process such as a fusion draw process or a slot draw process).

The glass-ceramics may be formed by ceramming a precursor glass substrate under any suitable conditions. The ceramming may include a nucleation treatment for the purposes of producing a nucleated glass substrate by forming crystal nuclei in the precursor glass substrate and a growth treatment to form the glass-ceramic article from the nucleated glass substrate.

The nucleation treatment may occur at any temperature sufficient to form a nucleated glass substrate. In general, the nucleation temperature is less than the growth temperature. In embodiments the nucleation temperature is greater than or equal to 750° C. to less than or equal to 950° C., such as greater than or equal to 760° C. to less than or equal to 940° C., greater than or equal to 770° C. to less than or equal to 930° C., greater than or equal to 780° C. to less than or equal to 920° C., greater than or equal to 790° C. to less than or equal to 910° C., greater than or equal to 800° C. to less than or equal to 900° C., greater than or equal to 810° C. to less than or equal to 890° C., greater than or equal to 820° C. to less than or equal to 880° C., greater than or equal to 830° C. to less than or equal to 870° C., greater than or equal to 840° C. to less than or equal to 860° C., greater than or equal to 800° C. to less than or equal to 850° C., and any and all sub-ranges formed from any of the foregoing endpoints. It should be understood that when the nucleation treatment is described as occurring at a given temperature the temperature refers to the environment in which the nucleation treatment occurs, such as a kiln, furnace, or oven.

The nucleation treatment may extend for any time period sufficient to form a nucleated glass substrate. In general, the nucleation time period is greater than the growth time period. In embodiments, the nucleation time period is greater than or equal to 0.5 hours to less than or equal to 8 hours, such as greater than or equal to 1 hour to less than or equal to 7 hours, greater than or equal to 2 hours to less than or equal to 6 hours, greater than or equal to 3 hours to less than or equal to 5 hours, greater than or equal to 1 hours to less than or equal to 4 hours, and any and all sub-ranges formed from any of the foregoing endpoints.

The growth treatment may occur at any temperature sufficient to form a glass-ceramic article from the nucleated glass substrate. In general, the growth temperature is greater than the nucleation temperature. In embodiments, the growth temperature is greater than or equal to 900° C. to less than or equal to 1100° C., such as greater than or equal to 910° C. to less than or equal to 1090° C., greater than or equal to 920° C. to less than or equal to 1080° C., greater than or equal to 930° C. to less than or equal to 1070° C., greater than or equal to 940° C. to less than or equal to 1060° C., greater than or equal to 950° C. to less than or equal to 1050° C., greater than or equal to 960° C. to less than or equal to 1040° C., greater than or equal to 970° C. to less than or equal to 1030° C., greater than or equal to 980° C. to less than or equal to 1020° C., greater than or equal to 990° C. to less than or equal to 1010° C., greater than or equal to 900° C. to less than or equal to 1000° C., and any and all sub-ranges formed from any of the foregoing endpoints. It should be understood that when the growth treatment is described as occurring at a given temperature the temperature refers to the environment in which the growth treatment occurs, such as a kiln, furnace, or oven.

The growth treatment may extend for any time period sufficient to form a glass-ceramic article from the nucleated glass substrate. In general, the growth time period is less than the nucleation time period. In embodiments, the growth time period is greater than or equal to 0.5 hours to less than or equal to 8 hours, such as greater than or equal to 1 hour to less than or equal to 7 hours, greater than or equal to 2 hours to less than or equal to 6 hours, greater than or equal to 3 hours to less than or equal to 5 hours, greater than or equal to 1 hours to less than or equal to 4 hours, and any and all sub-ranges formed from any of the foregoing endpoints.

In embodiments, the glass-ceramics are also chemically strengthened, such as by ion exchange, producing a glass-ceramic that is damage resistant for applications such as, but not limited to, display covers. The chemical strengthening of the glass-ceramic articles increases the strength of the glass-ceramic articles, such as may be characterized by the ring-on-ring test herein. With reference to FIG. 1, the glass-ceramic has a first region under compressive stress (e.g., first and second compressive layers 120, 122 in FIG. 1) extending from the surface to a depth of compression (DOC) of the glass-ceramic and a second region (e.g., central region 130 in FIG. 1) under a tensile stress or central tension (CT) extending from the DOC into the central or interior region of the glass-ceramic. As used herein, DOC refers to the depth at which the stress within the glass-ceramic changes from compressive to tensile. At the DOC, the stress crosses from a compressive stress to a tensile stress and thus exhibits a stress value of zero.

According to the convention normally used in the art, compression or compressive stress is expressed as a negative ($<0$) stress and tension or tensile stress is expressed as a positive ($>0$) stress. Throughout this description, however, CS is expressed as a positive or absolute value—i.e., as recited herein, CS=|CS|. The compressive stress (CS) may have a maximum at the surface of the glass-ceramic, and the CS may vary with distance d from the surface according to a function. Referring again to FIG. 1, a first compressive layer 120 extends from first surface 110 to a depth $d_1$ and a second compressive layer 122 extends from second surface 112 to a depth $d_2$. Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass-ceramic. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

The compressive stress of both compressive stress regions (120, 122 in FIG. 1) is balanced by stored tension in the central region (130) of the glass. The maximum central tension (CT) and DOC values are measured using a scattered light polariscope (SCALP) technique known in the art.

The lithium contained in the amorphous phase of the glass-ceramic and in the β-spodumene solid solution can undergo ion exchange, such as by utilizing molten sodium nitrate and/or potassium nitrate salt baths.

In the ion exchange treatment, the glass-ceramic articles are contacted with a molten salt bath. In embodiments, the glass-ceramic articles may be submerged in the molten salt bath. In embodiments, the molten salt bath includes a molten nitrate salt. In embodiments, the molten nitrate salt may be $KNO_3$, $NaNO_3$, or combinations thereof. In embodiments, the molten salt bath may include less than or equal to 100 wt % $KNO_3$, such as less than or equal to 90 wt % $KNO_3$, less than or equal to 80 wt % $KNO_3$, less than or equal to 70 wt % $KNO_3$, less than or equal to 60 wt % $KNO_3$, less than or equal to 50 wt % $KNO_3$, less than or equal to 40 wt % $KNO_3$, less than or equal to 30 wt % molten $KNO_3$, less than or equal to 20 wt % molten $KNO_3$, less than or equal to 10 wt % molten $KNO_3$, or less. In embodiments, the molten salt bath may include greater than or equal to 10 wt % $NaNO_3$, such as greater than or equal to 20 wt % $NaNO_3$, greater than or equal to 30 wt % $NaNO_3$, greater than or equal to 40 wt % $NaNO_3$, greater than or equal to 50 wt % $NaNO_3$, greater than or equal to 60 wt % $NaNO_3$, greater than or equal to 70 wt % $NaNO_3$, greater than or equal to 80 wt % $NaNO_3$, greater than or equal to 90 wt % $NaNO_3$, or more. In embodiments the molten salt bath may include 100 wt % $NaNO_3$. In embodiments, the molten salt bath may additionally include silicic acid, such as less than or equal to 1 wt % silicic acid.

The glass-ceramic may be exposed to the molten salt bath by dipping the glass-ceramic into the molten salt bath. Upon exposure to the glass-ceramic, the molten salt bath may, according to embodiments, be at a temperature of greater than or equal to 350° C. to less than or equal to 550° C., such as greater than or equal to 360° C. to less than or equal to 540° C., greater than or equal to 370° C. to less than or equal to 530° C., greater than or equal to 380° C. to less than or equal to 520° C., greater than or equal to 390° C. to less than or equal to 510° C., greater than or equal to 400° C. to less than or equal to 500° C., greater than or equal to 410° C. to less than or equal to 490° C., greater than or equal to 420° C. to less than or equal to 480° C., greater than or equal to 430° C. to less than or equal to 470° C., greater than or equal to 440° C. to less than or equal to 460° C., greater than or equal to 390° C. to less than or equal to 450° C., and any and all sub-ranges formed from any of the foregoing endpoints.

In embodiments, the glass-ceramic may be exposed to the molten salt bath for a time period greater than or equal to 30 minutes to less than or equal to 48 hours, such as greater than or equal to 30 minutes to less than or equal to 24 hours, greater than or equal to 1 hour to less than or equal to 44 hours, greater than or equal to 4 hours to less than or equal to 40 hours, greater than or equal to 8 hours to less than or equal to 36 hours, from greater than or equal to 12 hours to less than or equal to 32 hours, greater than or equal to 16 hours to less than or equal to 28 hours, greater than or equal to 20 hours to less than or equal to 24 hours, greater than or equal to 30 minutes to less than or equal to 8 hours, and all sub-ranges formed from any of the foregoing endpoints.

The ion exchanged glass-ceramic article includes a compressive stress layer extending from the surface thereof to a depth of compression, as described above with reference to FIG. 1. In embodiments, the depth of compression is greater than or equal to 10 µm, such as greater than or equal to 15 µm, greater than or equal to 20 µm, greater than or equal to 25 µm, greater than or equal to 30 µm, greater than or equal to 35 µm, greater than or equal to 40 µm, greater than or equal to 45 µm, greater than or equal to 50 µm, greater than or equal to 55 µm, or more. In embodiments, the depth of compression is greater than or equal to 10 µm to less than or equal to 60 µm, such as greater than or equal to 15 µm to less than or equal to 55 µm, greater than or equal to 20 µm to less than or equal to 50 µm, greater than or equal to 25 µm to less than or equal to 45 µm, greater than or equal to 30 µm to less than or equal to 40 µm, greater than or equal to 35 µm to less than or equal to 50 µm, and any and all sub-ranges formed from any of the foregoing endpoints. In embodiments, the depth of compression is less than or equal to 0.2t, where t is the thickness of the glass-ceramic article, such that the depth of compression may be greater than or equal to 10 µm to less than or equal to 0.2t.

The compressive stress layer of the ion exchanged glass-ceramic article includes a maximum compressive stress. In embodiments, the maximum compressive stress is greater than or equal to 100 MPa, or more. In embodiments, the maximum compressive stress is greater than or equal to 100 MPa to less than or equal to 1000 MPa.

After an ion exchange process is performed, it should be understood that a composition at the surface of the ion exchanged glass-ceramic may be different than the composition of the as-formed glass-ceramic (i.e., the glass-ceramic before it undergoes an ion exchange process). This results from one type of alkali metal ion in the as-formed glass-ceramic, such as, for example $Li^+$, being replaced with larger alkali metal ions, such as, for example $Na^+$ or $K^+$. However, the composition of the ion exchanged glass-ceramic article at or near the center thereof will be the least impacted by the ion exchange treatment and may, in embodiments, still have the composition of the as-formed glass-ceramic. Similarly, the ion exchange process may alter the microstructure at the surface of the glass-ceramic, such as by converting crystalline regions to amorphous regions or the opposite. The microstructure of the glass-ceramic at or near the center of the depth of the ion exchanged glass-ceramic article will, in embodiments, be the same as the microstructure of the as-formed glass-ceramic. As a result, the composition and microstructure at the center of the ion exchanged glass-ceramic article is expected to be the same as the composition and microstructure of the as-formed glass-ceramic. For the purposes of this discussion, the center of the ion exchanged glass-ceramic article refers to any portion of the interior of the ion exchanged glass-ceramic article located a distance of at least half the thickness from all surfaces thereof.

Figure 2A:
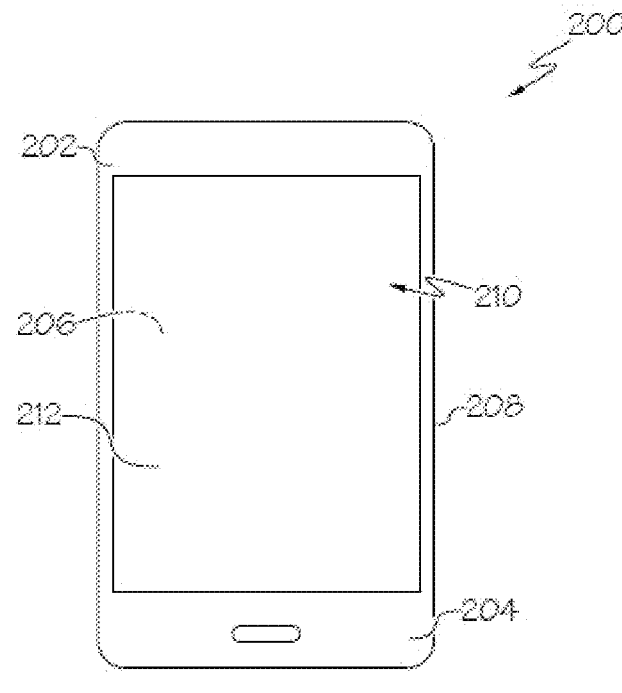
FIG. 2A is a plan view of an exemplary electronic device incorporating any of the glass-ceramic articles disclosed herein.
Figure 2B:
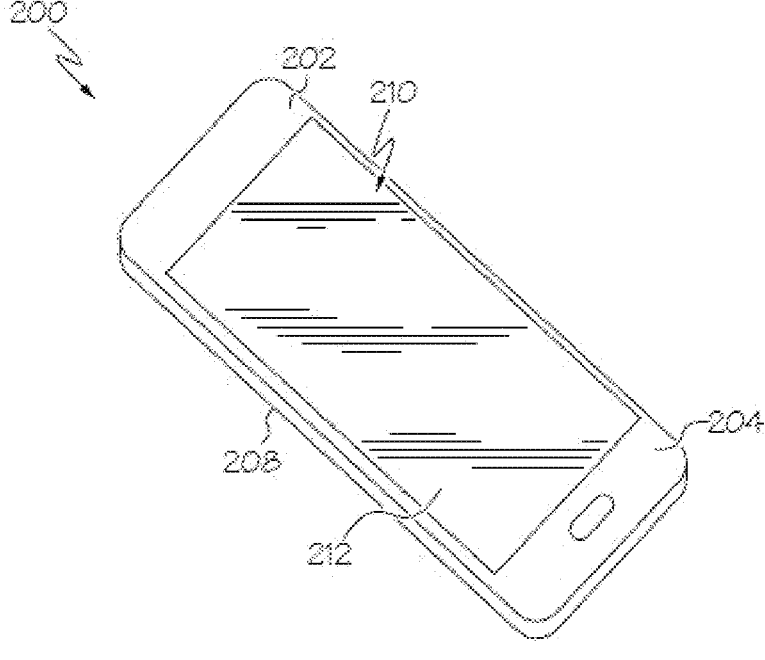
FIG. 2B is a perspective view of the exemplary electronic device of FIG. 2A.

The glass-ceramic articles disclosed herein, in as-formed or ion exchanged form, may be incorporated into another article such as an article with a display (or display articles) (e.g., consumer electronics, including mobile phones, tablets, computers, navigation systems, and the like), architectural articles, transportation articles (e.g., automobiles, trains, aircraft, sea craft, etc.), appliance articles, or any article that requires some transparency, scratch-resistance, abrasion resistance or a combination thereof. An exemplary article incorporating any of the glass-ceramic articles disclosed herein is shown in FIGS. 2A and 2B. Specifically, FIGS. 2A and 2B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, at least a portion of at least one of the cover substrate 212 and/or the housing 202 may include any of the glass-ceramic articles disclosed herein.

EXAMPLES

Embodiments will be further clarified by the following examples. It should be understood that these examples are not limiting to the embodiments described above.

Precursor glass substrates having the compositions listed in Table 1 below were prepared and cerammed according to the indicated ceramming schedules to form glass-ceramic articles. The first line in the ceramming cycle description is the nucleation treatment and the second line in the ceramming cycle description is the growth treatment. The temperature changes were at a ramp rate of 5° C./min. In Table 1, all components are provided in mol %, the appearance is reported based on observation of 0.5" thick samples, the phase assemblage was determined based on x-ray diffraction (XRD) analysis, and the L*, a*, b* reflectance color coordinates were measured using an X-rite Color i7 Benchtop Spectrophotometer using a F02 illuminant under SCI UVC conditions on 0.6 mm thick samples.

TABLE 1

| Example | 1 | 2 | 3 | 4 | 5 | 6 |
|---|---|---|---|---|---|---|
| $SiO_2$ | 73.3 | 73.0 | 72.5 | 73.0 | 71.0 | 75.0 |
| $Al_2O_3$ | 12.9 | 12.9 | 12.9 | 12.9 | 14.9 | 10.9 |
| $Li_2O$ | 7.5 | 7.5 | 7.5 | 7.5 | 7.5 | 7.5 |
| $Na_2O$ | 1.8 | 1.8 | 1.8 | 1.8 | 1.8 | 1.8 |
| MgO | 2.5 | 2.5 | 2.5 | 2.5 | 2.5 | 2.5 |
| $TiO_2$ | 0.5 | 0.5 | 0.5 | 0.0 | 0.0 | 0.0 |
| $SnO_2$ | 0.3 | 0.3 | 0.3 | 0.3 | 0.3 | 0.3 |

TABLE 1-continued

| Example | 1 | 2 | 3 | 4 | 5 | 6 |
|---|---|---|---|---|---|---|
| $ZrO_2$ | 1.3 | 1.5 | 2.0 | 2.0 | 2.0 | 2.0 |
| Ceramming Cycle | 825° C.-4 hr 970° C.-1 hr | 825° C.-4 hr 970° C.-1 hr | 825° C.-4 hr 970° C.-1 hr | 825° C.-4 hr 970° C.-1 hr | 825° C.-4 hr 970° C.-1 hr | 825° C.-4 hr 970° C.-1 hr |
| Primary Phase | β-spodumene | β-spodumene | β-spodumene | β-spodumene | β-spodumene | β-spodumene |
| Secondary Phase | $t-ZrO_2$ | $t-ZrO_2$ | $t-ZrO_2$ | $t-ZrO_2$ | $t-ZrO_2$ | $t-ZrO_2$ |
| Appearance | Brown Hazy Transparent | Brown Hazy Transparent | Brown Translucent | Light Purple Transparent | Hazy Transparent | Light Purple Transparent |
| L* | 91.1 | 93.1 | 90.9 | 94.2 | 92.4 | 93.5 |
| a* | −0.3 | −0.2 | −0.9 | −0.1 | 0.1 | −0.2 |
| b* | 5.2 | 6 | 8.4 | 4.9 | 4.6 | 5.9 |

Figure 3:
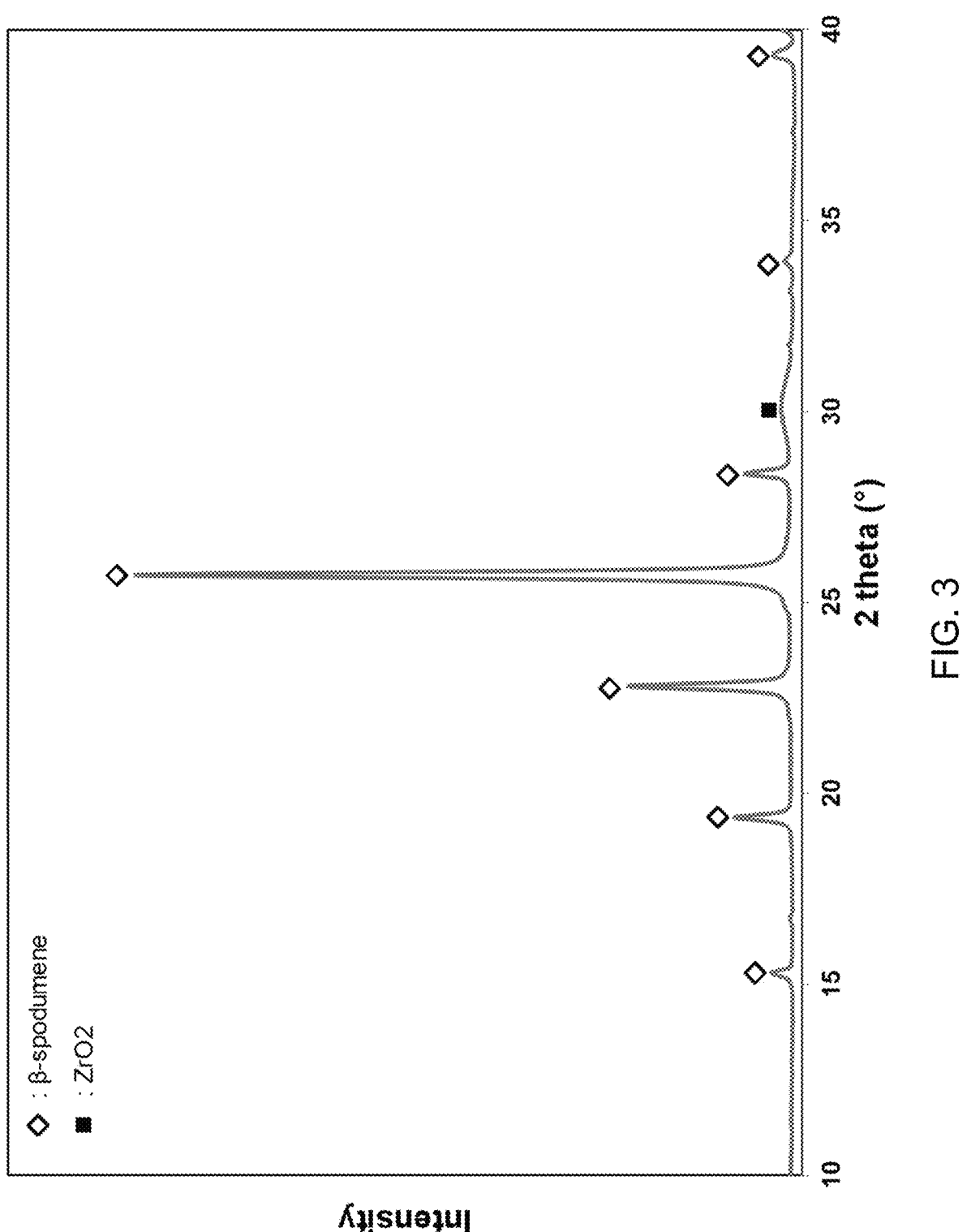
FIG. 3 is an x-ray diffraction analysis of a glass-ceramic article according to an embodiment.

FIG. 3 shows the XRD plot of Example 4, indicating the presence of both β-spodumene and tetragonal zirconia phases. The broad diffraction peak associated with the tetragonal zirconia phase indicates that this secondary crystal phase has an ultra-fine grain size, which is important for achieving high transparency due to the high refractive index (2.16) of crystalline zirconia and the refractive index mismatch with β-spodumene (1.97).

Figure 4:
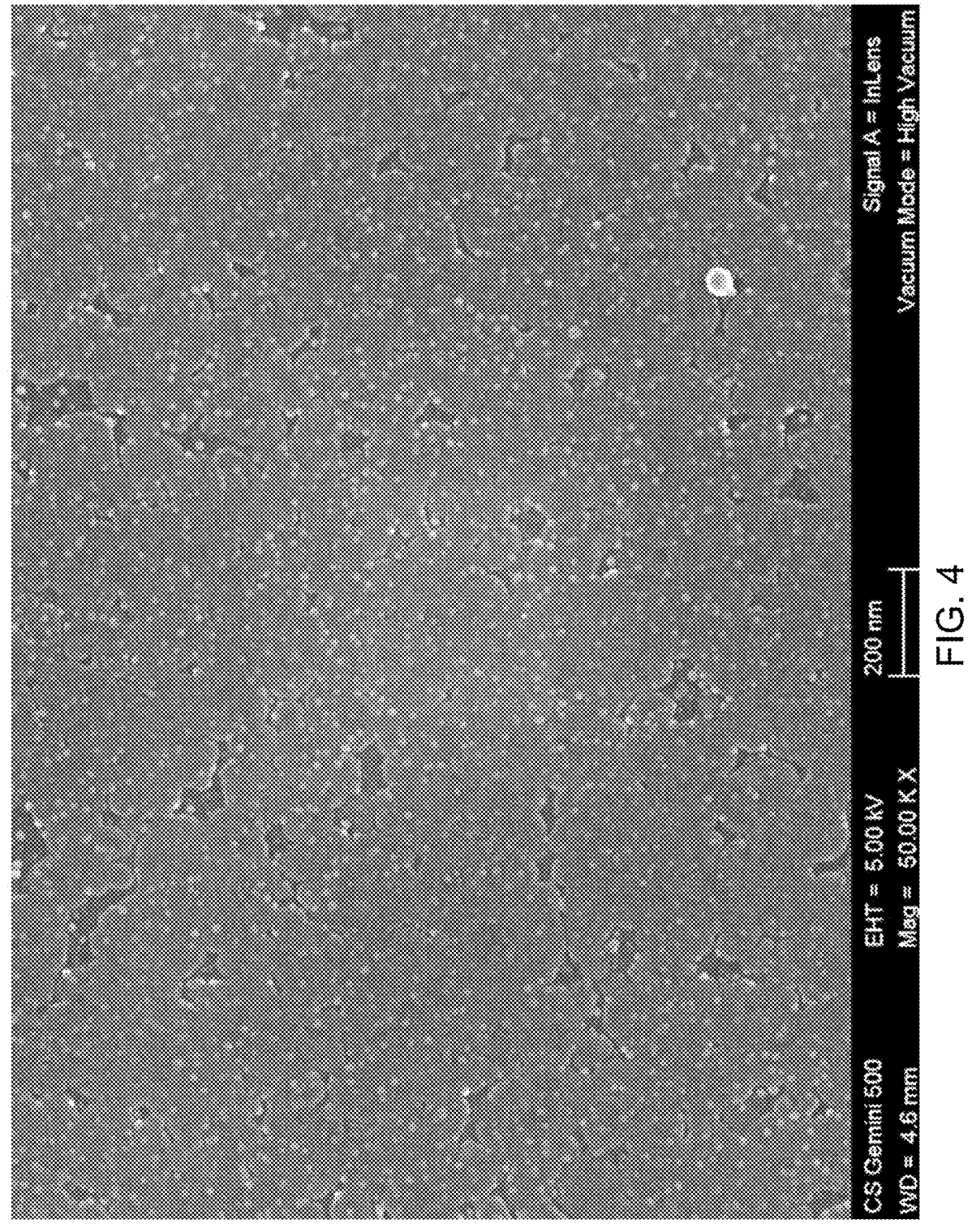
FIG. 4 is a scanning electron microscope image of a glass-ceramic article according to an embodiment.
Figure 5:
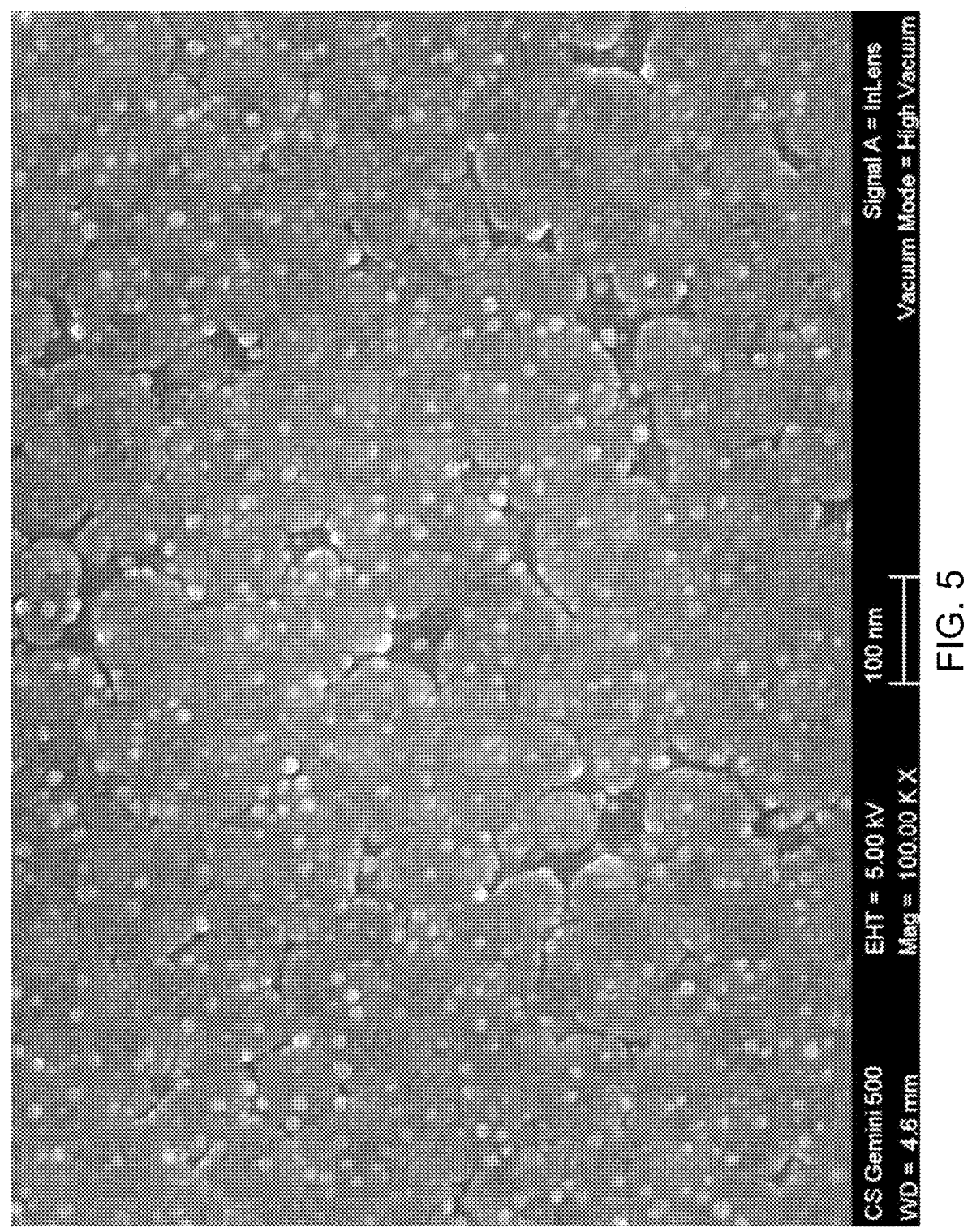
FIG. 5 is a scanning electron microscope image of the glass-ceramic article of FIG. 4 at a higher magnification.

A sample of Example 4 was polished and then etched with 0.5% hydrofluoric acid for 30 seconds. FIGS. 4 and 5 are scanning electron microscope (SEM) images of the polished and etched surface at different magnifications, showing the fine-grained microstructure of the glass-ceramic and that the tetragonal zirconia phase is located within and around β-spodumene grains.

Figure 6:
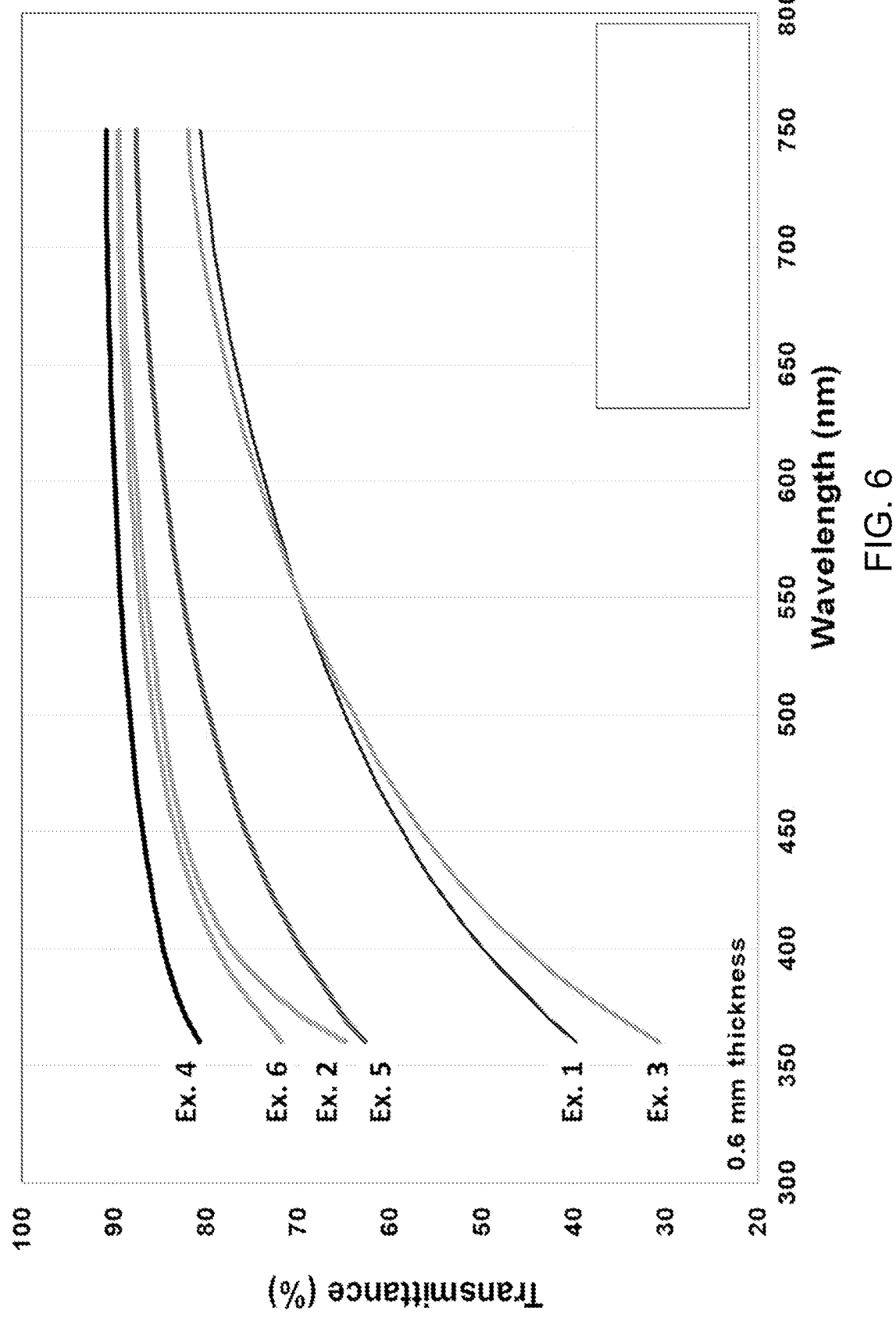
FIG. 6 is a plot of the measured transmittance as a function of wavelength of glass-ceramic articles according to an embodiments.

The transmittance of a samples according to Examples 1-6 with a thickness of 0.6 mm was measured as described above. The measured transmittance as a function of wavelength is shown in FIG. 6. It is believed that the fine grain size of the β-spodumene and tetragonal zirconia crystal phases contributes to the high transparency values.

All compositional components, relationships, and ratios described in this specification are provided in mol % unless otherwise stated. All ranges disclosed in this specification include any and all ranges and subranges encompassed by the broadly disclosed ranges whether or not explicitly stated before or after a range is disclosed.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A glass-ceramic article, comprising:
a primary crystal phase comprising β-spodumene solid solution;
a secondary crystal phase comprising tetragonal $ZrO_2$;
an amorphous phase;
greater than or equal to 0.2 mol % to less than or equal to 5 mol % MgO;
greater than or equal to 0 mol % to less than or equal to 0.5 mol % $TiO_2$; and
greater than or equal to 0.2 mol % to less than or equal to 4 mol % $ZrO_2$.

2. The glass-ceramic article of claim 1, wherein the glass-ceramic article has a transmittance of greater than or equal to 50% in the wavelength range from 400 nm to 780 nm measured at a thickness of 0.6 mm.

3. The glass-ceramic article of claim 1, comprising greater than or equal to 65 mol % to less than or equal to 80 mol % $SiO_2$.

4. The glass-ceramic article of claim 1, comprising greater than or equal to 71 mol % to less than or equal to 75 mol % $SiO_2$.

5. The glass-ceramic article of claim 1, comprising greater than or equal to 7 mol % to less than or equal to 18 mol % $Al_2O_3$.

6. The glass-ceramic article of claim 1, comprising greater than or equal to 5 mol % to less than or equal to 10 mol % $Li_2O$.

7. The glass-ceramic article of claim 1, comprising:
greater than or equal to 0.2 mol % to less than or equal to 5 mol % $Na_2O$, and
greater than or equal to 0 mol % to less than or equal to 4 mol % $K_2O$.

8. The glass-ceramic article of claim 1, comprising at least one of:
greater than or equal to 0.05 mol % to less than or equal to 1 mol % $SnO_2$,
greater than or equal to 0 mol % to less than or equal to 4 mol % $B_2O_3$,
greater than or equal to 0 mol % to less than or equal to 5 mol % ZnO, or
greater than or equal to 0 mol % to less than or equal to 3 mol % $P_2O_5$.

9. The glass-ceramic article of claim 1, wherein the β-spodumene solid solution has a grain size greater than or equal to 50 nm to less than or equal to 150 nm.

10. The glass-ceramic article of claim 1, wherein the tetragonal $ZrO_2$ has a grain size greater than or equal to 10 nm to less than or equal to 20 nm.

11. The glass-ceramic article of claim 1, comprising a crystallinity greater than or equal to 80 wt %.

12. The glass-ceramic article of claim 1, wherein L* is greater than or equal to 90.0 to less than or equal to 95.0.

13. The glass-ceramic article of claim 1, wherein a* is greater than or equal to −1.0 to less than or equal to 0.2, and b* is greater than or equal to 3.0 to less than or equal to 9.0.

14. The glass-ceramic article of claim 1, further comprising a compressive stress region extending from a surface of the glass-ceramic article to a depth of compression.

15. A consumer electronic product, comprising:
a housing having a front surface, a back surface and side surfaces;
electrical components provided at least partially within the housing, the electrical components including at least a controller, a memory, and a display, the display being provided at or adjacent the front surface of the housing; and a cover substrate disposed over the display, wherein at least a portion of at least one of the housing and the cover substrate comprises the glass-based article of claim 1.

16. A method, comprising:

ceramming a glass substrate to form a glass-ceramic article;

wherein the glass-ceramic article comprises:

a primary crystal phase comprising β-spodumene solid solution;

a secondary crystal phase comprising tetragonal $ZrO_2$;

an amorphous phase;

greater than or equal to 0.2 mol % to less than or equal to 5 mol % MgO;

greater than or equal to 0 mol % to less than or equal to 0.5 mol % $TiO_2$; and greater than or equal to 0.2 mol % to less than or equal to 4 mol % $ZrO_2$.

17. The method of claim 16, wherein the ceramming comprises:

treating the glass substrate at a nucleation temperature for a nucleation time period to form a nucleated glass substrate; and treating the nucleated glass substrate at a growth temperature for a growth time period to form the glass-ceramic article, wherein the nucleation temperature is less than the growth temperature and the nucleation time period is greater than the growth time period.

18. The method of claim 17, wherein the nucleation temperature is greater than or equal to 750° C. to less than or equal to 950° C. and the nucleation time period is greater than or equal to 0.5 hours to less than or equal to 8 hours.

19. The method of claim 17, wherein the growth temperature is greater than or equal to 900° C. to less than or equal to 1100° C. and the growth time period is greater than or equal to 0.5 hours to less than or equal to 8 hours.

20. The method of claim 16, comprising ion exchanging the glass-ceramic article to form a compressive stress region extending from a surface of the glass-ceramic article to a depth of compression.

\* \* \* \* \*